United States Patent
Knox

(10) Patent No.: US 7,079,643 B1
(45) Date of Patent: Jul. 18, 2006

(54) AUTOMATIC DETERMINATION OF DIALING METHODS FOR STORED UNIFORMLY FORMATTED PHONE NUMBERS

(76) Inventor: Lee B. Knox, 223 Voss Rd., Bethel Park, PA (US) 15102

(*) Notice: Subject to any disclaimer, the term of this patent is extended or adjusted under 35 U.S.C. 154(b) by 64 days.

(21) Appl. No.: 10/688,056

(22) Filed: Oct. 20, 2003

(51) Int. Cl.
 *H04M 1/53* (2006.01)
(52) U.S. Cl. ............ 379/355.06; 379/355.08; 455/460
(58) Field of Classification Search ........ 379/352–353, 379/355.05–355.08; 455/460
 See application file for complete search history.

(56) References Cited

U.S. PATENT DOCUMENTS 6,580,789 B1* 6/2003 Simpson et al. ....... 379/355.08
6,597,785 B1* 7/2003 Burke et al. ........... 379/355.08
2002/0137549 A1* 9/2002 Porter ..................... 455/564

* cited by examiner

*Primary Examiner*—Daniel Swerdlow
(74) *Attorney, Agent, or Firm*—Mark Levy & Associates, PLLC; David L. Banner

(57) ABSTRACT

The invention is a method for automatically determining the dialing sequence that is required for local, local long distance, ten digit local and long distance, long distance, and international dialing from an initial dialing database that contains no information about local telephone company dialing requirements and requires no or minimal human interaction. The method contains a database for logging call attempts, failures, and successes and an analysis algorithm to determine which dialing sequences are potentially failures and which are potentially successes and which are certain successes. Data from previous dialing attempts and analysis are used to determine dialing sequences for future calls to each area code and exchange. Each area code and exchange pair is quickly optimized without the need for purchasing or maintaining a third party dialing database and without manual definition of dialing sequences.

16 Claims, 3 Drawing Sheets a) YYY-ZZZZ – Local phone number
b) 1 YYY-ZZZZ – Local long distance
c) XXX YYY-ZZZZ – Local call in some regions
d) 1 XXX YYY-ZZZZ – Long distance call

Figure 1

Fields in the dialing results database table

Field 1: Area Code   (Alpha 3, Primary Key)
Field 2: Exchange   (Alpha 3, Primary Key)
Field 3: Method To Use (Integer)
Field 4: Method 1 Attempts  (Integer)
Field 5: Method 1 Dial Failures  (Integer)
Field 6: Method 1 Connects  (Integer)
Field 7: Method 2 Attempts  (Integer)
Field 8: Method 2 Dial Failures  (Integer)
Field 9: Method 2 Connects  (Integer)
Field 10: Method 3 Attempts  (Integer)
Field 11: Method 3 Dial Failures  (Integer)
Field 12: Method 3 Connects  (Integer)
Field 13: Method 4 Attempts  (Integer)
Field 14: Method 4 Dial Failures  (Integer)
Field 15: Method 4 Connects  (Integer)

Figure 3

AUTOMATIC DETERMINATION OF DIALING METHODS FOR STORED UNIFORMLY FORMATTED PHONE NUMBERS

FIELD OF THE INVENTION

This invention relates generally to telephone dialing sequences and more particularly to an apparatus and method for automatically determining a correct telephone dialing sequence for local, inter-lata, intra-lata, long distance, and international numbers when the source of phone numbers is a uniform dataset that does not specify local dialing requirements.

DISCUSSION OF RELATED ART

Dialing sequences, generally speaking, must be accurate to reliably complete phone calls. When a uniformly formatted database of phone numbers is used this can require the user of a "dialing device" (an archaic term that originated with rotary dial instruments but now meant to include push button devices and electronic devices that generate tone or other connections sequences to a telephone system) to provide these formats. Sometimes the format requires that the user manually configure numerous area codes and exchanges.

With the increasing redistribution of area codes across the country and the addition of new area codes based on demand, dialing methods are continuously changing and the manual redefinition of the dialing methods has become tedious and unreliable. In addition the constant changing of dialing sequences and dialing sequences that are inconsistent across many locales can provide hardship to older users and users with poor eyesight or other handicaps. Some areas require dialing 1 for local long distance others require dialing only a 10 digit number while other local calls may be seven digits.

The inventive algorithm eliminates the need to manually configure the dialing methods for each area code and exchange.

There are products available that can be purchased which are databases that contain the dialing methods for different areas in the country. The inventive method is a significant improvement over the third party database solution since it does not require the use of third party software and information systems which need to be updated periodically and are typically expensive.

SUMMARY OF THE INVENTION

The present invention processes any arbitrary phone number and determines how to dial it so that the call will be completed regardless of the phone company's dialing requirements. In accordance with the principles of the present invention, a dialing sequence construction is accomplished by a processor in a lookup, assemble, test, record, and analyze cycle to determine the correct dialing sequence for the locality of origination of the phone call. The successful dialing sequence is automatically determined and is compliant with the local telephone company dialing requirements.

The inventive algorithm chooses the exact dialing sequence from a known set of sequences. Once a proposed dialing sequence is constructed the number is dialed. The results of the dial are stored in the database table as successes or failures. An unqualified success indicates that the constructed sequence is correct and should be used for all subsequent calls to that area code and exchange.

When a dialing attempt fails, as indicated by various telephone company responses the dialing results database table is updated to indicate that the dialing sequence has failed. The failure is stored as an increased count in failures but does not necessarily indicate that the dialing sequence is wrong. A failure is indicated by telephone company responses that indicate that the call cannot be connected, these responses include fast busy, and special information tones.

When the computer system connects, the dialing results database table for the selected dialing method is incremented as successful.

In an entirely computer automated system, a positive response from a contact, such as a dual tone multi-frequency (key press) is interpreted as absolute proof that the dialing sequence is correct for the constructed phone number. The dialing results table is then updated to reflect that the successful dialing sequence should be used for subsequent dialing to that area code and exchange.

BRIEF DESCRIPTION OF THE DRAWINGS

Features and advantages of the present invention will become apparent to those skilled in the art from the following description with reference to the drawings, in which:

FIG. 1 illustrates the formats for common dialing sequences;

FIG. 3 is an illustration of a representative database table that records activities for each area code and exchange pair.

DETAILED DESCRIPTION OF THE PREFERRED EMBODIMENTS

The present invention is preferably used with computerized equipment. These inventive methods are designed to determine dialing sequences that allow call completion of calls from any database that contains formatted phone numbers, without requiring any specification of dialing methods for the locality of origination of the dialing.

Referring now to FIG. 1, there is shown present day dialing sequences that are used to dial (a) local, (b) local long distance, (c) 10 digit local and long distance dialing, and (d) long distance. This FIG. 1 summarizes the present day set of available dialing sequences from which one or more sequence will yield a successful result. Other formats may be used in ones community and additional formats may well be adopted in the future. In the figure, XXX refers to an area code, YYY refers to an exchange, and ZZZZ refers to the last four digits of a phone number.

Figure 2A:
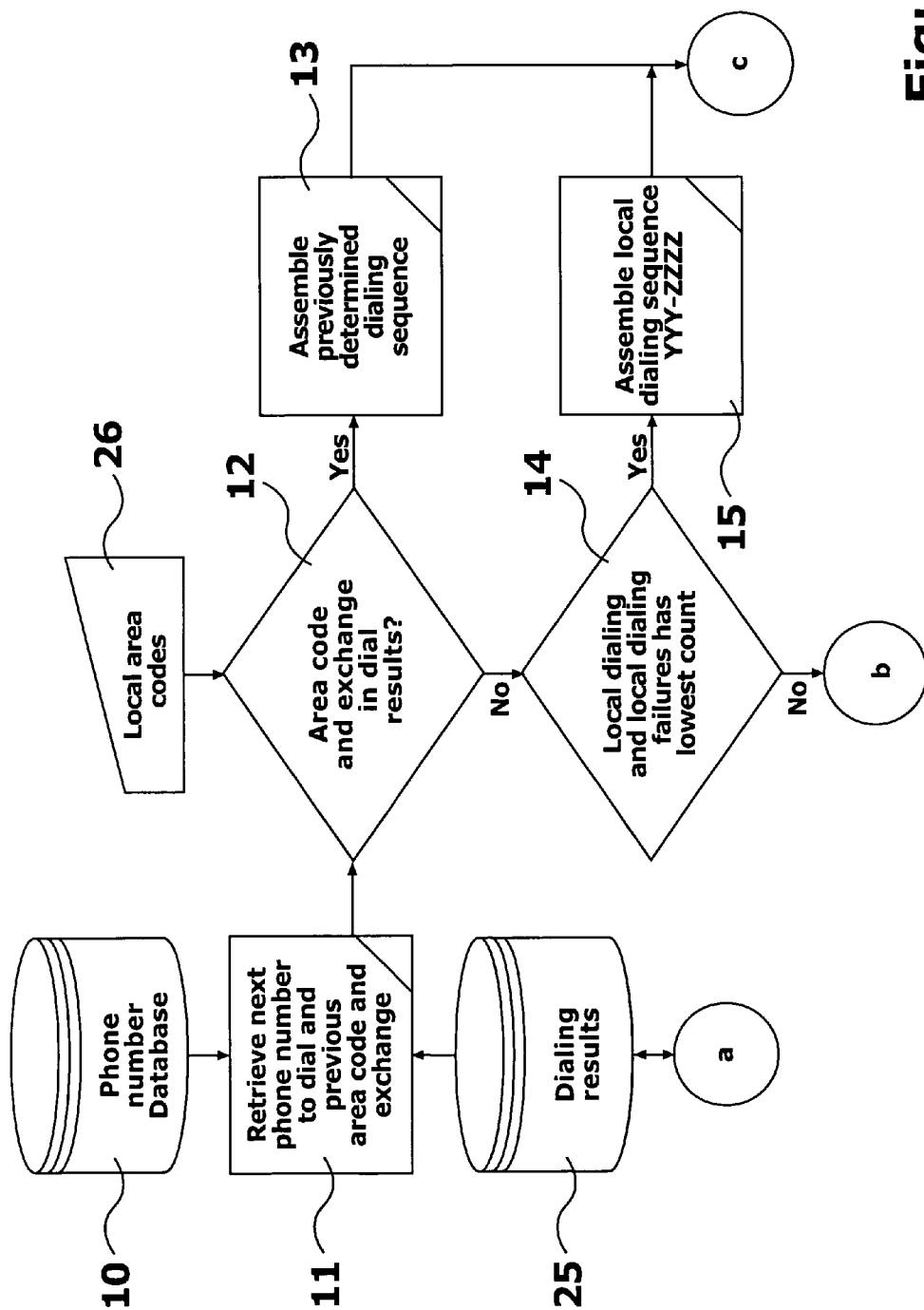
FIGS. 2a and 2b illustrate a process block diagram and flow chart representation of the inventive method.
Figure 2B:
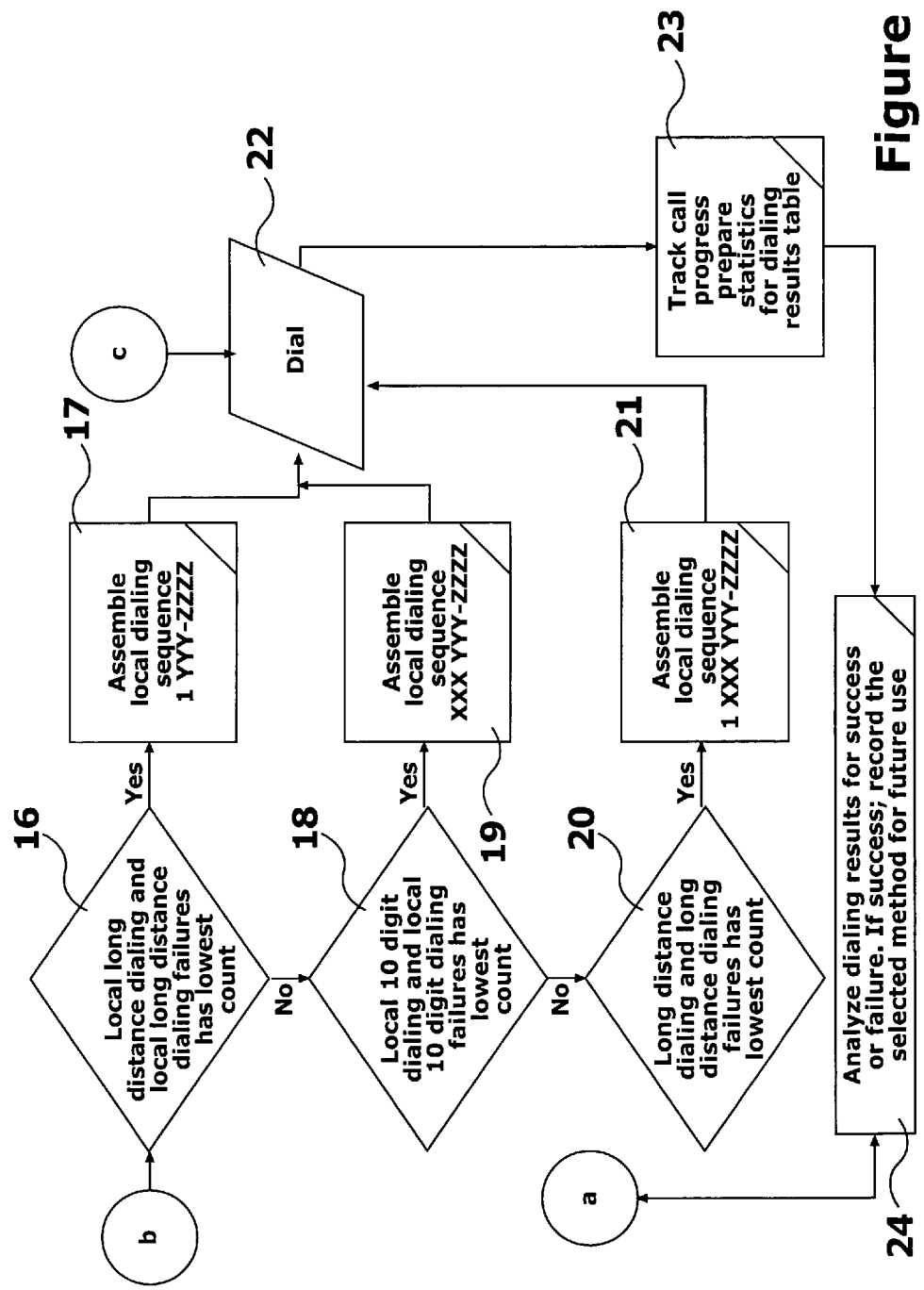

Referring now to FIGS. 2a and 2b, this is a combination process block diagram and flow chart that illustrates the core decision processes in the preferred embodiment of the inventive method. A database 10 stores phone numbers for the required contacts. In process 11 the system retrieves the next phone number to contact from the phone number database table 10, it then attempts to retrieve the area code and exchange pair from a dialing results table 25 (that is further described by FIG. 3).

The retrieved information, including phone number and dialing history, is passed to decision process 12. Decision process 12 tests whether the area code is a local exchange that was previously entered by the user in system input 26. If the phone number from the phone number database 10 is not a local area code as defined by the user entries in 26, control is passed to process 13 to assemble the dialing sequence as a long distance dialing sequence, process 13 (see FIG. 1(*d*)). If the phone number retrieved from the phone number database 10 does not have an area code, the area code stored in 26 is pre-pended to the phone number before steps 13 or 14 are performed. If the area code of the retrieved phone number from table 10 matches the local area code from user definition 26, control is passed to the local dialing process 14.

Decision process 14 compares the quantity of calling attempts plus the quantity of dialing failures (as retrieved from table 25 area code and exchange key pair record) that were of the format of FIG. 1(*a*) and when the dialing format history has the fewest attempts plus failures then control will be transferred to process 15.

Otherwise control flow is passed to the decision process 16. Decision process 16 compares the quantity of calling attempts plus the quantity of dialing failures (as retrieved from table 25 area code and exchange key pair record) that were of the format of FIG. 1(*b*) and when the dialing format history has the fewest attempts plus failures then control will be transferred to process 17.

Otherwise control flow is passed to the decision process 18. Decision process 18 compares the quantity of calling attempts plus the quantity of dialing failures (as retrieved from table 25's area code and exchange key pair record) that were of the format of FIG. 1(*c*) and when the dialing format history has the fewest attempts plus failures then control will be transferred to process 19.

Otherwise control flow is passed to process 20, which transfers control to assembly process 21 unless new or international dialing formats are later added.

The inventive algorithm also incorporates the number of potential successes such that decision process 14, 16, or 18 compare the quantity of calling attempts plus the quantity of dialing failures minus the number of potential successes (as retrieved from table 25 area code and exchange key pair record).

The execution of decision processes 14, 16, 18, 20 may be reordered without departing from the true spirit of the invention. Additional decision processes and control flow, such as 14 and assembly process 15, may be added with alternate dialing sequences to allow the algorithm to operate with additional dialing methods without departing from the true spirit of the invention.

Processes 13, 15, 17, 19, 21, and other processes for subsequently added Telephone Company dialing formats, construct a string of characters that are used for connecting through the telephone company to the ultimate destination for the phone call or data delivery. Present day formats are shown in FIGS. 2*a* and 2*b* in processes 13, 15, 17, 19, 21 and in FIG. 1(*a*, b, c, d).

Process 22 communicates the constructed connection sequence to the telephone company by "dialing." The dialing process includes initiating and monitoring the progress of the dialing sequences and the telephone company's response to the dialing attempt. The telephone company's response is call progress and is passed to the tracking and identification process 23. The identified telephone company responses are passed to analysis process 24.

The analysis process 24 categorizes the identified responses from the telephone company as presented by process 23 and determines from these identified responses how to store the data into the dialing results table 25. In process 24 the dialing results are categorized into potential dialing failures, potential dialing successes, and certain dialing success. Possible failure is a known response from the telephone company that indicates the call, as dialed, could not be connected. Possible successes are dialing results that are not possible failures. Certain success is determined by any response that is determined to be a connect, such as a human response from the dialed phone number.

The analysis process 24 stores the identified and categorized dialing results into table 25 into the appropriate fields as described in FIG. 3. Upon determination of certain success field 3 of FIG. 3 is set to a value that would indicate to processes 12 which dialing method should be used for future dialing into the presently successful dialed area code and exchange key pair record in dialing results table 25.

Referring now to FIG. 3, fields stored in the exemplary dialing results table are as follows:

Field 1: This field stores the area code for any area code that was encountered Field 2: This field stores the exchange for any area code that was encountered Field 3: This field indicates the method to use and has special numeric values.

An exemplary value of 9 indicates that the dialing sequence has not yet been determined.

An exemplary value of 1 indicates that a successful connection has been made and that all future dialing to this area code and phone number should use sequence of FIG. 1(*a*).

An exemplary value of 2 indicates that a successful connection has been made and that all future dialing to this area code and phone number should use sequence of FIG. 1(*b*).

An exemplary value of 3 indicates that a successful connection has been made and that all future dialing to this area code and phone number should use sequence of FIG. 1(*c*).

An exemplary value of 4 indicates that a successful connection has been made and that all future dialing to this area code and phone number should use sequence of FIG. 1(*d*).

Fields 4, 7, 10, 13: These fields are incremented by one on each call attempt that uses the respective dialing method. They are an indication of the number of calls that were attempted using any of the dialing methods of FIG. 1(*a*, b, c, d), respectively.

Fields 5, 8, 11, 14: These fields are incremented by one for each dialing failure that occurs using any of the methods shown in FIG. 1(*a*, b, c, d), respectively. They are an indication of the number of calls that had possible failure.

Fields 6, 9, 12, 15: These fields are incremented by one for each dialing connection that occurs using any of the methods shown in FIG. 1(*a*, b, c, d) respectively. They are an indication of the number of calls that had possible but not certain success.

EXEMPLARY USE OF THE INVENTIVE METHOD

An example of the use of the inventive method starts with a calling list of phone numbers collected during customer interviews, sales, or user request to dial. The calling list is stored in ten digit format without regard for the actual method that is required to dial the phone call from any particular location. Changes in a customers account or a simple need to contact the person identified requires dialing per the local phone company's specification. The inventive method enables speedy dialing without knowledge of or concern for local dialing requirements by the phone company. In the presented example when the status of a customer account changes and a message must be delivered to the customer, the inventive method executes within the telephone or telephony equipment to establish a connection to the destination. During each attempt to connect, using the inventive method, monitoring logging takes place and the method determines the correct dialing for subsequent attempts to that area code and exchange.

In summary the inventive method empirically derives appropriate dialing sequences from uniformly stored phone numbers for local, local long distance, ten digit dialing and long distance, then stores the successful results in the dialing results table for speedy dialing of repeated dialing to the same area code and exchange.

While the invention has been described with reference to the exemplary embodiments thereof, those skilled in the art will be able to make various modifications to the described embodiments of the invention without departing from the true spirit and scope of the invention.

Having thus described the invention, what is desired to be protected by Letters Patent is presented in the subsequently appended claims

What is claimed is:

1. A method for determining a correct telephone dialing sequence for a uniformly formatted phone number, the steps comprising:
   a) providing a phone number database containing at least one telephone number having a predetermined, uniform format;
   b) providing an updatable call result database comprising at least one of the fields: a dialing method to use, a count of dialing attempts, a count of dialing failures, and a count of successfully connected calls;
   c) retrieving a phone number to be called from said phone number database;
   d) selecting a potentially operable dialing sequence for dialing said retrieved phone number from a predetermined set of dialing sequences;
   e) dialing said retrieved phone number using said selected dialing sequence thereby initiating a dialed call and automatically determining a result of said dialing operation;
   f) automatically storing said result in a record of said call result database associated with said retrieved phone number;
   g) automatically determining if said dialed call has been successfully connected; and
   h) if said dialed call has not been successfully completed, using at least said result to automatically select another of said predetermined set of dialing sequences.

2. The method for determining a correct telephone dialing sequence as recited in claim 1, wherein steps (e) through (h) are automatically repeated if said dialed call is not successfully completed.

3. The method for determining a correct telephone dialing sequence as recited in claim 2, wherein said call result may be classified as one of the results: possible failure, certain failure, possible success, and certain success.

4. The method for determining a correct telephone dialing sequence as recited in claim 1, wherein said step (g) determining if said dialed call has been successfully connected is automatically performed using at least one of the qualifications: a voice response, and a DTMF key press.

5. The method for determining a correct telephone dialing sequence as recited in claim 3, wherein said step (d) selecting a potentially operable dialing sequence comprises using information derived from at least one result of a previously dialed phone call previously automatically stored in said database during said storing step (f).

6. The method for determining a correct telephone dialing sequence as recited in claim 5, wherein when said call result is a certain success result, indicating that said selected one of said potentially operable dialing sequences is a correct dialing sequence for a phone call having an area code and an exchange matching an area code and an exchange of said retrieved phone call.

7. The method for determining a correct telephone dialing sequence as recited in claim 1, wherein said method is performed using at least one of the systems: a personal computer system, an embedded computer system, a PBX, and a distributed computing system.

8. The method for determining a correct telephone dialing sequence as recited in claim 1, wherein said dialed call is dialed on at least one of the communications systems: a land line, a wireless communications network, the Internet, and other telephonic telecommunications dialing system.

9. The method for determining a correct telephone dialing sequence as recited in claim 1, wherein said potentially operable dialing sequences comprise a dialing sequence associated with an alternate long distance service.

10. The method for determining a correct telephone dialing sequence as recited in claim 9, wherein said dialing sequence associated with an alternate long distance service comprises a dialing prefix.

11. The method for determining a correct telephone dialing sequence as recited in claim 1, wherein after a predetermined number of dialing attempts return an unsuccessful dialing result, any indication of correctness of a dialing sequence for an area code and exchange associated with said dialed call is modified.

12. The method for determining a correct telephone dialing sequence as recited in claim 1, further comprising:
   i) providing means for configuring whereby a preferred one of said set of potentially operable dialing sequences may be initially selected.

13. The method for determining a correct telephone dialing sequence as recited in claim 1, the steps further comprising:
   i) inputting an area code and associating at least one preferred dialing sequence therewith.

14. The method for determining a correct telephone dialing sequence as recited in claim 13, wherein said inputting step (i) comprises inputting an exchange code.

15. The method for determining a correct telephone dialing sequence as recited in claim 13, wherein said inputting step (i) comprises storing said inputted area code in said call results database.

16. The method for determining a correct telephone dialing sequence as recited in claim 1, wherein said dialed call, upon successful connection, communicates at least one of the information types: voice, audio, fax, data, text, pictures, and video.

* * * * *